United States Patent
Takanashi

(10) Patent No.: US 12,305,084 B2
(45) Date of Patent: May 20, 2025

(54) ADHESIVE POLYORGANOSILOXANE COMPOSITION

(71) Applicant: MOMENTIVE PERFORMANCE MATERIALS JAPAN LLC, Tokyo (JP)

(72) Inventor: Masanori Takanashi, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 1044 days.

(21) Appl. No.: 17/293,302

(22) PCT Filed: Nov. 13, 2019

(86) PCT No.: PCT/JP2019/044513
§ 371 (c)(1),
(2) Date: May 12, 2021

(87) PCT Pub. No.: WO2020/100936
PCT Pub. Date: May 22, 2020

(65) Prior Publication Data
US 2021/0395582 A1 Dec. 23, 2021

(30) Foreign Application Priority Data
Nov. 13, 2018 (JP) ................................. 2018-212984

(51) Int. Cl.
*C09J 183/04* (2006.01)
*C08K 3/36* (2006.01)
*C09J 11/04* (2006.01)

(52) U.S. Cl.
CPC ............. *C09J 183/04* (2013.01); *C09J 11/04* (2013.01); *C08K 3/36* (2013.01); *C08K 2201/006* (2013.01)

(58) Field of Classification Search
None
See application file for complete search history.

(56) References Cited

U.S. PATENT DOCUMENTS

| | | | |
|---|---|---|---|
| 5,248,715 A * | 9/1993 | Gray | C08L 83/04 524/786 |
| 8,389,650 B2 | 3/2013 | Takanashi et al. | |
| 9,303,164 B2 | 4/2016 | Takanashi | |
| 2010/0190396 A1 | 7/2010 | Nozoe et al. | |
| 2010/0208189 A1 | 8/2010 | Takanashi | |
| 2012/0123051 A1 | 5/2012 | Kuwata | |
| 2012/0301644 A1 | 11/2012 | Blackwood et al. | |
| 2013/0065999 A1 | 3/2013 | Takanashi | |
| 2015/0337189 A1 | 11/2015 | Takanashi et al. | |
| 2019/0161666 A1 | 5/2019 | Tanigawa et al. | |

FOREIGN PATENT DOCUMENTS

| | | |
|---|---|---|
| JO | 2013516521 A | 5/2013 |
| JP | 2004323764 A | 11/2004 |
| JP | 2006117845 A | 5/2006 |
| JP | 2006257355 A * | 9/2006 |
| JP | 2008156441 A | 7/2008 |
| JP | 2011026523 A | 2/2011 |
| JP | 2013124297 A | 6/2013 |
| WO | 2008020635 A1 | 2/2008 |

OTHER PUBLICATIONS

JP2006257355 English Machine Translation, prepared Nov. 16, 2023. (Year: 2023).*
Extended European Search Report (EESR) dated Jul. 18, 2022, issued in counterpart European Application No. 19883403.8.
U.S. Appl. No. 16/319,612, First Named Inventor: Masanori Takanashi; Title: "Thermally Conductive Polyorganosiloxane Composition", filed Jan. 22, 2019.
U.S. Appl. No. 16/319,624, First Named Inventor: Eiji Tanigawa; Title: "Surface Treatment Agent for Thermally Conductive Polyorganosiloxane Composition", filed Jan. 22, 2019.
U.S. Appl. No. 16/319,639, First Named Inventor: Daigo Hirakawa; Title: "Thermally Conductive Polysiloxane Composition", filed Jan. 22, 2019.
U.S. Appl. No. 16/481,086, First Named Inventor: Daigo Hirakawa; Title: "Thermally Conductive Polyorganosiloxane Composition", filed Jul. 26, 2019.
International Search Report (ISR) (and English language translation thereof) dated Feb. 10, 2020 issued in International Application No. PCT/JP2019/044513.
Japanese Office Action (and English language translation thereof) dated Jun. 23, 2020 issued in Japanese Application No. 2020-509120.
Written Opinion dated Feb. 10, 2020 issued in International Application No. PCT/JP2019/044513.

* cited by examiner

*Primary Examiner* — Christopher M Rodd
(74) *Attorney, Agent, or Firm* — Holtz, Holtz & Volek PC

(57) ABSTRACT

An adhesive polyorganosiloxane composition includes: (A) a polyorganosiloxane having 2 or more alkenyl groups in each molecule thereof; (B) a polyorganohydrodienesiloxane having 3 or more hydrogen atoms bonded to a silicon atom in each molecule thereof; (C) a platinum-based catalyst; (D) at least two kinds of adhesion-imparting agents selected from the group consisting of specific organic silicon compounds, silane compounds, tetraalkoxysilane compounds, and/or partial hydrolysis condensates thereof; (E) hexamethyldisilazane; (F) water; and (G) at least one of (G1) and (G2), where (G1) is a non-surface-treated inorganic filler having a BET specific surface area of 50 to 500 m²/g, and (G2) is an inorganic filler obtained by surface-treating said (G1) with hexamethyldisilazane.

16 Claims, No Drawings

ADHESIVE POLYORGANOSILOXANE COMPOSITION

TECHNICAL FIELD

The present invention relates to an adhesive polyorganosiloxane composition that is cured by addition reaction.

BACKGROUND ART

Polyorganosiloxane compositions of addition reaction curing type are cured at room temperature to exhibit adhesion with respect to various adherends. Patent Literature 1 proposes an adhesive polyorganosiloxane composition which includes silica surface-treated with hexamethyldisilazane (Patent Literature 1).

CITATION LIST

Patent Literature

Patent Literature 1: Japanese Patent Application Kokai Publication No. 2008-156441

SUMMARY OF INVENTION

Technical Problem

However, the composition described in Patent Literature 1 has a low curing rate at room temperature and low adhesion to various substrates.

An object of the present invention is to provide an adhesive polyorganosiloxane composition of addition reaction type which is rapidly cured even at room temperature and exhibits excellent adhesion to various substrates.

Solution to Problem

The present inventor carried out extensive studies directed to achieving the above object and has consequently found that the object can be achieved by designing an adhesive polyorganosiloxane composition so that the composition includes an inorganic filler optionally surface-treated with hexamethyldisilazane beforehand, and further includes hexamethyldisilazane as a surface treatment agent for the inorganic filler. The present invention has been completed based on the finding.

The present invention pertains to the following [1] to [5].

[1] An adhesive polyorganosiloxane composition including:
(A) a polyorganosiloxane having 2 or more alkenyl groups in the molecule;
(B) a polyorganohydrogensiloxane having 3 or more hydrogen atoms bonded to a silicon atom in the molecule;
(C) a platinum-based catalyst;
(D) at least two kinds of adhesion imparting agents selected from the group consisting of the following (D1) to (D4):
(D1) an organosilicon compound having a hydrogen atom bonded to a silicon atom, and a side chain of the following formula (I) bonded to a silicon atom:

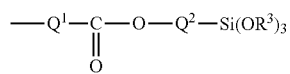

(I)

(D2) an organosilicon compound having a $Si(OR^3)_n$ group and an epoxy-containing group, and/or a partially hydrolyzed condensate thereof;
(D3) a silane compound having a $Si(OR^3)_n$ group and an aliphatic unsaturated hydrocarbon group, and/or a partially hydrolyzed condensate thereof; and
(D4) a tetraalkoxysilane compound represented by $Si(OR^4)_4$, and/or a partially hydrolyzed condensate thereof;
wherein $Q^1$ denotes a linear or branched alkylene group forming a carbon chain having 2 or more carbon atoms between the silicon atom and the ester bond; $Q^2$ denotes a linear or branched alkylene group forming a carbon chain having 3 or more carbon atoms between the oxygen atom and the silicon atom in the side chain; $R^3$ denotes an alkyl group having 1 to 4 carbon atoms or a 2-methoxyethyl group; $R^4$ denotes an alkyl group having 1 to 3 carbon atoms; and n is an integer of 1 to 3);
(E) hexamethyldisilazane;
(F) water; and
(G) at least one kind of an inorganic filler selected from (G1) and (G2):
(G1) an inorganic filler without surface treatment having a BET specific surface area of 50 to 500 $m^2/g$; and
(G2) an inorganic filler obtained by surface-treating said (G1) with hexamethyldisilazane.

[2] The adhesive polyorganosiloxane composition described in [1], wherein (A) is a combination including (A1) a linear polyorganosiloxane that is blocked with an $R_3SiO_{1/2}$ unit at both terminals and includes an $R^2_2SiO_{2/2}$ unit as an intermediate unit, and has a viscosity at 23° C. of 0.1 to 500 Pa·s; and (A2) a branched polyorganosiloxane that essentially includes a $SiO_{4/2}$ unit and an $R_3SiO_{1/2}$ unit and optionally includes one or more kinds of units selected from the group consisting of an $R_2SiO_{2/2}$ unit and/or an $RSiO_{3/2}$ unit, wherein R is $R^1$ or $R^2$, $R^1$ is an alkenyl group, $R^2$ is a monovalent hydrocarbon group having no aliphatic unsaturated bonds, and two or more groups $R^1$ are present in the molecule.

[3] The adhesive polyorganosiloxane composition described in [1] or [2], wherein (C) is a platinum-vinylsiloxane complex.

[4] The adhesive polyorganosiloxane composition described in any of [1] to [3], further including (H1) a zirconium compound.

[5] The adhesive polyorganosiloxane composition described in any of [1] to [4], further including (H2) a reaction inhibitor.

Advantageous Effects of Invention

The adhesive polyorganosiloxane compositions of addition reaction type provided according to the present invention are cured rapidly even at room temperature and exhibit excellent adhesion to various substrates.

DESCRIPTION OF EMBODIMENTS

Definition of Terms

Structural units in siloxane compounds are sometimes abbreviated as follows (hereinafter, these structural units are sometimes written as "M units", "$D^H$ units" and so on).

M: $Si(CH_3)_3O_{1/2}$
$M^H$: $SiH(CH_3)_2O_{1/2}$ $M^{Vi}$: $(CH=CH_2)(CH_3)_2SiO_{1/2}$
D: $Si(CH_3)_2O_{2/2}$
$D^H$: $SiH(CH_3)O_{2/2}$
$D^{Vi}$: $Si(CH=CH_2)(CH_3)O_{2/2}$
T: $Si(CH_3)O_{3/2}$
Q: $SiO_{4/2}$ (tetrafunctional)

Specific examples of the groups in the present specification are as follows.

Examples of the monovalent hydrocarbon groups include alkyl groups, cycloalkyl groups, aryl groups, aralkyl groups and alkenyl groups. Examples of the monovalent hydrocarbon groups having no aliphatic unsaturated bonds include the monovalent hydrocarbon groups mentioned above except the alkenyl groups.

The alkenyl groups are linear or branched groups having 2 to 6 carbon atoms, with examples including vinyl group, allyl group, 3-butenyl group and 5-hexenyl group.

The alkyl groups are linear or branched groups having 1 to 18 carbon atoms, with examples including methyl group, ethyl group, propyl group, butyl group, pentyl group, hexyl group, octyl group, decyl group, dodecyl group, hexadecyl group and octadecyl group.

The cycloalkyl groups are monocyclic or polycyclic groups having 3 to 20 carbon atoms, with examples including cyclopentyl group and cyclohexyl group.

The aryl groups are aromatic groups having 6 to 20 carbon atoms which contain a monocyclic or polycyclic group, with examples including phenyl group and naphthyl group.

The aralkyl groups are alkyl groups substituted with an aryl group, with examples including 2-phenylethyl group and 2-phenylpropyl group.

The alkylene groups are linear or branched groups having 1 to 18 carbon atoms, with examples including methylene group, ethylene group, trimethylene group, 2-methylethylene group and tetramethylene group.

The alkenyl groups, the alkyl groups, the cycloalkyl groups, the aryl groups, the aralkyl groups and the alkylene groups may be substituted with substituents such as halogens including chlorine, fluorine and bromine; and cyano groups. Examples of such groups substituted with a halogen or a cyano group include chloromethyl group, chlorophenyl group, 2-cyanoethyl group and 3,3,3-trifluoropropyl group.

In the present specification, the "polyorganosiloxane (A) having 2 or more alkenyl groups in the molecule" is also written as "(A)". The same applies to other components such as the "platinum-based catalyst (C)".

[Adhesive Polyorganosiloxane Compositions]

An adhesive polyorganosiloxane composition (hereinafter, also written as the "composition") includes:
(A) a polyorganosiloxane having 2 or more alkenyl groups in the molecule;
(B) a polyorganohydrogensiloxane having 3 or more hydrogen atoms bonded to a silicon atom in the molecule;
(C) a platinum-based catalyst;
(D) at least two kinds of adhesion imparting agents selected from the group consisting of the following (D1) to (D4):
(D1) an organosilicon compound having a hydrogen atom bonded to a silicon atom, and a side chain of the following formula (I) bonded to a silicon atom:

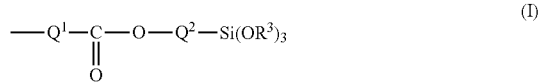

(I)

(D2) an organosilicon compound having a $Si(OR^3)_n$ group and an epoxy-containing group, and/or a partially hydrolyzed condensate thereof;
(D3) a silane compound having a $Si(OR^3)_n$ group and an aliphatic unsaturated hydrocarbon group, and/or a partially hydrolyzed condensate thereof; and
(D4) a tetraalkoxysilane compound represented by $Si(OR^4)_4$, and/or a partially hydrolyzed condensate thereof;
wherein $Q^1$ denotes a linear or branched alkylene group forming a carbon chain having 2 or more carbon atoms between the silicon atom and the ester bond; $Q^2$ denotes a linear or branched alkylene group forming a carbon chain having 3 or more carbon atoms between the oxygen atom and the silicon atom in the side chain; $R^3$ denotes an alkyl group having 1 to 4 carbon atoms or a 2-methoxyethyl group; $R^4$ denotes an alkyl group having 1 to 3 carbon atoms; and n is an integer of 1 to 3;

(E) hexamethyldisilazane;
(F) water; and
(G) at least one kind of an inorganic filler selected from (G1) and (G2):
(G1) an inorganic filler without surface treatment having a BET specific surface area of 50 to 500 $m^2/g$; and
(G2) an inorganic filler obtained by surface-treating said (G1) with hexamethyldisilazane.

The composition can achieve excellent adhesion to various substrates, in particular, die-cast aluminum, polyphenylene sulfide resins (PPS resins) and polybutylene terephthalate resins (PBT resins) at room temperature (for example, 23° C.) in a curing time of 1 week at most, preferably 72 hours, and particularly preferably 24 hours. Further, the composition can achieve excellent adhesion to various substrates (in particular, die-cast aluminum and polyphenylene sulfide resins (PPS resins)) at 50° C. in a curing time of 30 minutes.

The composition includes (E) hexamethyldisilazane, and (G). As a result of (A) to (D) and (E) being included in the composition, (G) is surface-treated with (E) in the presence of the components in the composition (especially, in the presence of (A)) during the process of preparing the composition. When the composition includes (E) and (G2), (G2) is surface-treated more efficiently with (E) in the presence of the components in the composition (especially, in the presence of (A)) as compared to when the composition does not include (E) and does include (G2).

⟨(A) Polyorganosiloxanes Having 2 or More Alkenyl Groups in Molecule⟩

The polyorganosiloxane (A) having 2 or more alkenyl groups in the molecule (hereinafter, also written as the "alkenyl group-containing polyorganosiloxane (A)") is a component that serves as a base polymer in the composition. (A) is not particularly limited as long as it has, on average, 2 or more alkenyl groups bonded to a silicon atom in the molecule and can form a network structure by addition reaction with the hydrosilyl groups (Si—H groups) of (B). Typically, (A) has in the molecule thereof at least two alkenyl group-containing siloxane units represented by the general formula (II):

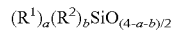

(II)

wherein,
R¹ is an alkenyl group;
R² is a monovalent hydrocarbon group having no aliphatic unsaturated bonds;
a is an integer of 1 to 3; and
b is an integer of 0 to 2, with the proviso that a+b is 1 to 3. The number of the alkenyl groups bonded to a silicon atom in (A) is preferably 2 to 100, and more preferably 2 to 50 per molecule.

For the reasons that the synthesis is easy and deterioration is avoided in the fluidity of the composition before curing and in the heat resistance of the composition after curing, R¹ is preferably a vinyl group. To take advantage of easy synthesis, a is preferably 1. For the reasons that the synthesis is easy and an excellent balance is attained in properties such as mechanical strength and fluidity before curing, R² is preferably a methyl group.

In other siloxane units in (A), such organic groups are bonded to silicon atoms as, for example, monovalent hydrocarbon groups having no aliphatic unsaturated bonds. The organic groups are preferably methyl groups for the same reasons as R².

R¹ may be present at a terminal and/or anywhere in the middle of the molecular chain of (A).

The siloxane skeleton of (A) may be linear or branched. That is, (A) may be a linear alkenyl group-containing polyorganosiloxane (A1) or a branched alkenyl group-containing polyorganosiloxane (A2).

Examples of the linear alkenyl group-containing polyorganosiloxanes (A1) include linear polyorganosiloxanes that are blocked with an $R_3SiO_{1/2}$ unit at both terminals and include an $R^2{}_2SiO_{2/2}$ unit as an intermediate unit. Here, R is R¹ or R², and two or more of the groups R in the molecule are R¹. The $R_3SiO_{1/2}$ units in (A1) are preferably $R^1R^2{}_2SiO_{1/2}$ units, $R^1{}_2R^2SiO_{1/2}$ units or $R^1{}_3SiO_{1/2}$ units, and particularly preferably $R^1R^2{}_2SiO_{1/2}$ units. That is, (A1) is particularly preferably a linear polyorganosiloxane that is blocked with an $M^{vi}$ unit (a dimethylvinylsiloxane unit) at both terminals and includes only a D unit (a dimethylsiloxane unit) as the intermediate unit.

Examples of the branched alkenyl group-containing polyorganosiloxanes (A2) include branched polyorganosiloxanes that essentially include a $SiO_{4/2}$ unit and an $R_3SiO_{1/2}$ unit and optionally include an $R_2SiO_{2/2}$ unit and/or an $RSiO_{3/2}$ unit. Here, R is R¹ or R², and two or more of the groups R in the molecule are R¹. To ensure that the groups R will serve as crosslinking sites in the curing reaction, it is preferable that at least three groups R in the molecule are R¹ and the rest are R². For the reason that the composition gives cured products having excellent mechanical strength, the polyorganosiloxane is preferably one which is in the form of a solid resin or a viscous semisolid resin at room temperature and has a molar ratio of the $R_3SiO_{1/2}$ unit to the $SiO_{4/2}$ unit in the range of 1:0.8 to 1:3.

In (A2), R¹ may be present as R in the $R_3SiO_{1/2}$ unit or may be present as R in the $R_2SiO_{2/2}$ unit or the $RSiO_{3/2}$ unit. For the reason that curing proceeds rapidly at room temperature, it is preferable that part or all of the $R_3SiO_{1/2}$ units are $R^1R^2{}_2SiO_{1/2}$ units.

The viscosity of (A) at 23° C. is preferably 0.1 to 500 Pa·s, more preferably 0.5 to 300 Pa·s, and particularly preferably 1.0 to 200 Pa·s. When the viscosity of (A) is in the above range, the adhesion to various substrates may be enhanced efficiently, and the composition exhibits good fluidity in an uncured state to offer excellent workability in a casting or potting process and attains excellent mechanical strength and appropriate elasticity and hardness after being cured. To attain higher adhesion even at room temperature, the viscosity of (A) is preferably high. In the case where (A) is a combination of two or more kinds of alkenyl group-containing polyorganosiloxanes, the viscosity of (A) is the viscosity of the mixture of the polyorganosiloxanes. In the present specification, the viscosity is a value measured in accordance with JIS K 6249 using a rotational viscometer at 23° C. while appropriately selecting the spindle number and the rotational speed.

(A) may be one kind of a polyorganosiloxane, or a combination of two or more kinds of polyorganosiloxanes. (A) is preferably a mixture of a linear alkenyl group-containing polyorganosiloxane (A1) and a branched alkenyl group-containing polyorganosiloxane (A2). Particularly preferably, (A) is a combination including a linear polyorganosiloxane (A1') that is blocked with an $R^1R^2{}_2SiO_{1/2}$ unit at both terminals and includes an $R^2{}_2SiO_{2/2}$ unit as an intermediate unit, and has a viscosity at 23° C. of 0.1 to 500 Pa·s; and a branched polyorganosiloxane (A2') that essentially includes a $SiO_{4/2}$ unit, an $R^1R^2{}_2SiO_{1/2}$ unit and an $R^2{}_3SiO_{1/2}$ unit and optionally includes an $R_2SiO_{2/2}$ unit and/or an $RSiO_{3/2}$ unit, wherein R is R¹ or R², R¹ is an alkenyl group, R² is a monovalent hydrocarbon group having no aliphatic unsaturated bonds, and two or more groups R¹ are present in the molecule.

⟨(B) Polyorganohydrogensiloxanes Having 3 or More Hydrogen Atoms Bonded to Silicon Atom in Molecule⟩

The polyorganohydrogensiloxane (B) having 3 or more hydrogen atoms bonded to a silicon atom in the molecule (hereinafter, also written as the "polyorganohydrogensiloxane (B)") functions as a crosslinking agent for (A) as a result of the hydrosilyl groups contained in the molecule undergoing addition reaction with R¹ in (A). (B) is not particularly limited as long as it has in the molecule 3 or more hydrogen atoms bonded to a silicon atom which are involved in the addition reaction to form a cured network structure.

Typically, (B) has in the molecule 3 or more units represented by the general formula (III):

   (III)

Wherein,
R⁵ denotes a monovalent hydrocarbon group having no aliphatic unsaturated bonds;
c is an integer of 0 to 2; and
d is an integer of 1 to 3, with the proviso that c+d is an integer of 1 to 3.

For the reason of easy synthesis, R⁵ is preferably a methyl group. Further, d is preferably 1 to facilitate the synthesis.

To facilitate the synthesis, (B) preferably includes 3 or more siloxane units. To ensure that (B) will not volatilize even when heated to a curing temperature and will exhibit high fluidity and will be easily mixed with (A), the number of the siloxane units in (B) is preferably 6 to 200, and particularly preferably 10 to 150.

The siloxane skeleton in (B) may be linear, branched or cyclic, and is preferably linear.

(B) is preferably a linear polyorganohydrogensiloxane (B1) that is blocked with an $R^6{}_3SiO_{1/2}$ unit independently at both terminals and includes only an $R^6{}_2SiO_{2/2}$ unit as the intermediate unit, or a polyorganohydrogensiloxane (B2) consisting solely of an $R^6{}_3SiO_{1/2}$ unit and a $SiO_{4/2}$ unit, wherein R⁶ independently at each occurrence denotes a hydrogen atom or a monovalent hydrocarbon group having no aliphatic unsaturated bonds, and with the proviso that at least three of R⁶ in the molecule are hydrogen atoms. In the cases of (B1) and (B2), examples of the $R^6_3SiO_{1/2}$ units include $HR^7_2SiO_{1/2}$ units and $R^7_3SiO_{1/2}$ units, and examples of the $R^6_2SiO_{2/2}$ units include $HR^7SiO_{2/2}$ units and $R^7_2SiO_{2/2}$ units, wherein $R^7$ is a monovalent hydrocarbon group having no aliphatic unsaturated bonds. In the case of (B1), the hydrogen atoms bonded to a silicon atom may be present at the terminals or in the intermediate units but are preferably present in the intermediate units.

Particularly preferably, (B) is a linear polymethylhydrogensiloxane (B1-1) that is blocked with an M unit (a trimethylsiloxane unit) at both terminals and includes only a $D^H$ unit (a methylhydrogensiloxane unit) as the intermediate unit, a linear polymethylhydrogensiloxane (B1-2) that is blocked with an M unit (a trimethylsiloxane unit) at both terminals, includes only a D unit (a dimethylsiloxane unit) and a $D^H$ unit (a methylhydrogensiloxane unit) as the intermediate units, and contains the methylhydrogensiloxane units in 0.1 to 2.0 mol per mol of the dimethylsiloxane units, or a polymethylhydrogensiloxane (B2-1) consisting solely of an $M^H$ unit (a dimethylhydrogensiloxane unit) and a Q unit (a $SiO_{4/2}$ unit).

(B) may be one kind of a polyorganohydrogensiloxane, or a combination of two or more kinds of polyorganohydrogensiloxanes.

⟨(C) Platinum-Based Catalysts⟩

The platinum-based catalyst (C) promotes the addition reaction between the alkenyl groups in (A) and the hydrosilyl groups in (B), and allows (D1) and/or (D3) described later to be introduced into the siloxane network structure of the crosslinked polymer through the similar addition reaction.

Examples of (C) include platinum compounds such as chloroplatinic acid, reaction products of chloroplatinic acid with an alcohol, platinum-olefin complexes, platinum-vinylsiloxane complexes, platinum-ketone complexes and platinum-phosphine complexes. Among these, platinum-vinylsiloxane complexes are preferable due to good catalytic activity, and platinum-1,1,3,3-tetramethyl-1,3-divinyldisiloxane complex is particularly preferable for the reason that the composition is cured quickly at room temperature to exhibit adhesion.

(C) may be one kind of a platinum-based catalyst, or a combination of two or more kinds of platinum-based catalysts.

⟨(D) Adhesion Imparting Agents⟩

The adhesion imparting agents (D) are at least two kinds of adhesion imparting agents selected from the group consisting of the following (D1) to (D4):

(D1) an organosilicon compound having a hydrogen atom bonded to a silicon atom, and a side chain of the following formula (I) bonded to a silicon atom:

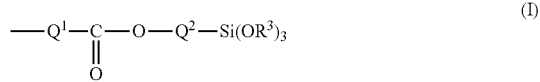

(D2) an organosilicon compounds having a $Si(OR^3)_n$ group and an epoxy-containing group, and/or a partially hydrolyzed condensate thereof;

(D3) a silane compound having a $Si(OR^3)_n$ group and an aliphatic unsaturated hydrocarbon group, and/or a partially hydrolyzed condensate thereof; and (D4) a tetraalkoxysilane compound represented by $Si(OR^4)_4$, and/or a partially hydrolyzed condensate thereof, wherein $Q^1$, $Q^2$, $R^3$, $R^4$ and n are as described hereinabove.

(D) are components that impart adhesion with respect to various substrates to the composition. Further, the composition containing (D) comes to exhibit adhesion with respect to various substrates at room temperature. (D1), (D2), (D3) and (D4) may be each a single kind of a compound, or a combination of two or more kinds of compounds. For example, (D) may be a combination of a single kind of (D1), two kinds of (D2) and two kinds of (D3).

⟨⟨(D1)⟩⟩

(D1) is a component that is introduced into the crosslinked siloxane structure by addition reaction with (A) and (B) during the addition reaction for the curing of the composition, and has a side chain of the formula (I) which is responsible for adhesion, thus contributing to the adhesion of the composition at room temperature. Further, the alkoxy groups present in the side chain of (D1) (in (D1), $OR^3$ may be or is not a 2-methoxyethoxy group) undergo co-hydrolysis/condensation reaction with the alkoxy groups of (D2), (D3) and/or (D4) and thereby contribute to introducing (D2), (D3) and/or (D4) into the siloxane skeleton.

For the reason of easy synthesis and handling, $Q^1$ is preferably an ethylene group or a 2-methylethylene group. $Q^2$ is preferably a trimethylene group to facilitate the synthesis and handling. For the reasons that good adhesion is imparted and the alcohol resulting from the hydrolysis is easily volatilized, $R^3$ is preferably a methyl group or an ethyl group, and particularly preferably a methyl group.

To facilitate the synthesis, the hydrogen atom and the side chain described above which are the characteristics of (D1) are preferably bonded to different silicon atoms. Thus, the basic portion of (D1) preferably forms a linear, branched or cyclic siloxane skeleton, and is particularly preferably a cyclic siloxane skeleton for the reason that the specific compound can be synthesized and purified in a well controlled manner There may be 1 or more Si—H bonds in (D1), and in the case of a cyclic siloxane compound, the number thereof is preferably 2 or 3.

Examples of (D1) include the following compounds.

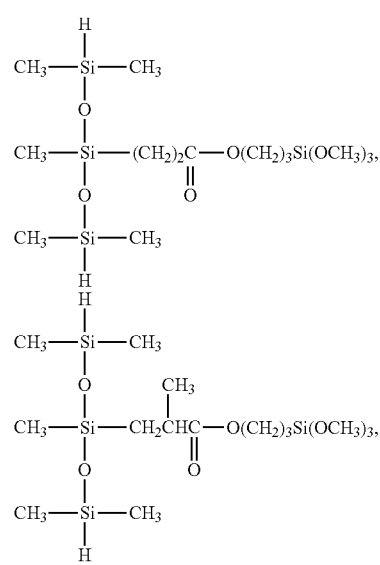

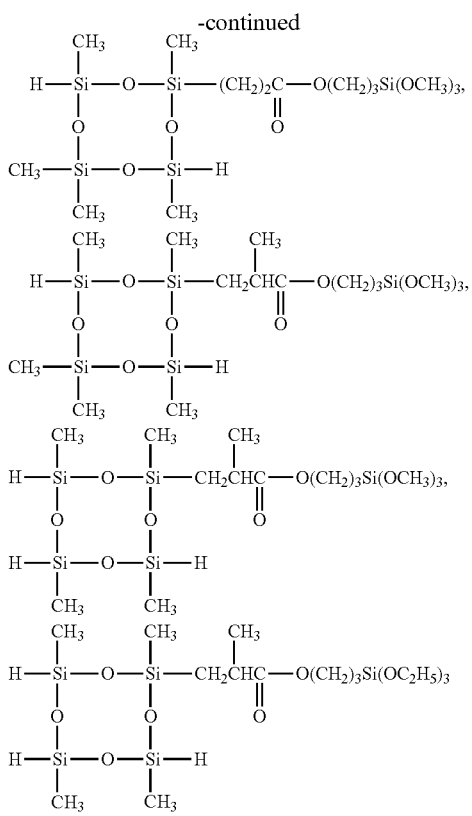

⟨⟨(D2)⟩⟩

(D2) is a component that has an alkoxy group bonded to a silicon atom (hereinafter, OR³ may be a 2-methoxyethoxy group) and is introduced into the crosslinked siloxane structure by the co-hydrolysis/condensation reaction between the alkoxy group thereof and the alkoxy group bonded to a silicon atom in (D1), (D3) and/or (D4). (D2) also has an epoxy group responsible for adhesion and thus contributes to enhancing the adhesion of the composition at room temperature, particularly with respect to plastics.

To ensure that good adhesion will be imparted, R³ is preferably a methyl group or an ethyl group, and particularly preferably a methyl group. The letter n is preferably 2 or 3. To facilitate the synthesis and to ensure that the group will not be hydrolyzed and will exhibit good adhesion, the epoxy-containing group is preferably, for example, an aliphatic epoxy-containing group having an ether oxygen atom, such as a 3-glycidoxypropyl group; or an alicyclic epoxy-containing group such as a 2-(3,4-epoxycyclohexyl) ethyl group. The total number of the alkoxy groups bonded to a silicon atom is preferably 2 or more in the molecule. The group OR³ and the epoxy-containing group may be bonded to the same silicon atom or may be bonded to different silicon atoms.

Examples of (D2) include 3-glycidoxypropyl group-containing alkoxysilanes such as 3-glycidoxypropyltrimethoxysilane, 3-glycidoxypropyltriethoxysilane and 3-glycidoxypropyl(methyl)dimethoxysilane; 2-(3,4-epoxycyclohexyl) ethyl group-containing alkoxysilanes such as 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane; partially hydrolyzed condensates of the above silanes in which n is 2 or greater; and carbon/silicon bifunctional siloxanes obtained from linear or cyclic methylsiloxanes by replacing the part of the methyl groups with a trimethoxysiloxy group or a 2-(trimethoxysilyl)ethyl group and with the epoxy-containing group described hereinabove.

⟨⟨(D3)⟩⟩

(D3) is a component that is introduced into the crosslinked siloxane structure by the hydrolysis/condensation reaction between its alkoxy group bonded to a silicon atom and the alkoxy group bonded to a silicon atom in the molecule of (D1), (D2) and/or (D4) or is introduced into the crosslinked siloxane structure by addition reaction of an aliphatic unsaturated hydrocarbon group in (D3) with (B) during the addition reaction for the curing of the composition. Further, the alkoxy group in (D3) undergoes co-hydrolysis/condensation reaction with the alkoxy group of other (D3) and, when used in combination with (D2), the alkoxy group in (D2) to introduce other (D3) and/or (D2) into the siloxane structure. The remaining alkoxy groups are responsible for adhesion and contribute to enhancing the adhesion of the composition at room temperature, particularly with respect to metals.

To ensure that good adhesion will be imparted, R³ is preferably a methyl group or an ethyl group, and particularly preferably a methyl group. The letter n is preferably 2 or 3. The aliphatic unsaturated hydrocarbon group may be bonded directly to a silicon atom in the case of an alkenyl group such as vinyl, allyl or 3-butenyl, or may be such that an unsaturated acyloxy group is bonded to a silicon atom via 3 or more carbon atoms as in the case of 3-acryloxypropyl or 3-methacryloxypropyl. To facilitate the synthesis and handling, for example, the unsaturated hydrocarbon group-containing group is preferably a vinyl group or a methacryloxypropyl group.

Examples of (D3) include alkenylalkoxysilanes and/or partially hydrolyzed condensates thereof, such as vinyltrimethoxysilane, vinyltriethoxysilane, vinyltris(2-methoxyethoxy)silane, methylvinyldimethoxysilane, allyltrimethoxysilane, allyltriethoxysilane and methylallyldimethoxysilane; and (meth)acryloxypropyl (methyl)di- and (meth)acryloxypropyltri-alkoxysilanes and/or partially hydrolyzed condensates thereof, such as 3-acryloxypropyltrimethoxysilane, 3-acryloxypropyltriethoxysilane, 3-acryloxypropyl(methyl) dimethoxysilane, 3-methacryloxypropyltrimethoxysilane, 3-methacryloxypropyltriethoxysilane and 3-methacryloxypropyl(methyl)dimethoxysilane.

⟨⟨(D4)⟩⟩

(D4) is a component that further enhances the adhesion of the composition with respect to metals at room temperature. Examples of R⁴ include linear or branched alkyl groups such as methyl, ethyl, propyl and isopropyl. For the reasons of easy availability, easy handling and significant effects in enhancing the adhesion, methyl group and ethyl group are preferable. Further, (D4) is preferably a partially hydrolyzed condensate of a tetraalkoxysilane compound for the reasons of excellent hydrolyzability and low toxicity.

Preferred Embodiments (D) preferably includes a combination of (D1), (D2), (D3) and/or (D4).

⟨⟨(E) Hexamethyldisilazane⟩⟩

Hexamethyldisilazane (E) functions as a surface treatment agent for (G) described later. As a result of hexamethyldisilazane (E) being contained in the composition, the residual silanol groups (Si—OH) in (G1) and (G2) are treated with (E) in the presence of other components contained in the composition (for example, (A)). In other words, (G1) and/or (G2) in the composition is treated with a mixture of (E) and a component other than (E) (for example, (A)). Thus, (G1) that has been surface-treated with (E) in the composition differs from (G2) in that the former is surface-treated with a mixture of (E) and a component other than (E) (for example, (A)). As a result of the surface treatment, (G) attains higher compatibility with components such as (A), (B), (C) and/or (D) and consequently the composition that is obtained comes to exhibit higher adhesion and a higher curing rate at room temperature.

⟨(F) Water⟩

The water (F) is a component that hydrolyzes (E) to allow (E) to function as a surface treatment agent for (G). Examples of the waters (F) include clean water, ion-exchanged water, distilled water and ultrapure water, with ion-exchanged water being preferable.

⟨(G) At Least One of (G1) and (G2)⟩

(G) is at least one of (G1) and (G2). Here, (G1) is an inorganic filler without surface treatment having a BET specific surface area (also written simply as "specific surface area" in the present specification) of 50 to 500 $m^2/g$ (hereinafter, these inorganic fillers are also written as the "non-surface-treated inorganic fillers (G1)"). (G2) is an inorganic filler obtained by surface-treating said (G1) with hexamethyldisilazane.

The inorganic filler added to the composition, irrespective of whether it is untreated or has been surface-treated, is surface-treated with hexamethyldisilazane to attain increased compatibility with the components contained in the composition. That is, the addition of (E), (F) and (G) to the composition means that the composition includes an inorganic filler resulting from the surface treatment of the non-surface-treated inorganic filler (G1) with hexamethyldisilazane (E), or means that the composition includes an inorganic filler resulting from the surface treatment of the inorganic filler (G2) obtained by surface-treating a non-surface-treated inorganic filler with hexamethyldisilazane is further surface-treated with hexamethyldisilazane (E). Further, it is preferable that (G) is surface-treated with (E) in the presence of (A). When (G) is surface-treated with (E) in the presence of (A), the compatibility of (G) with (A) is increased and consequently the curing rate and adhesion at room temperature are further enhanced. In this case, (G) is (G) that has been surface-treated with a mixture of (A) and (E).

Examples of the inorganic fillers for (G) include reinforcing fillers such as fumed silica, pyrogenic silica, silica aerogel, precipitated silica and fumed titanium oxide; and non-reinforcing fillers such as diatomaceous earth, ground silica, aluminum oxide, zinc oxide, aluminosilicic acid, calcium carbonate, magnesium carbonate, zinc carbonate, calcium silicate, talc and ferric oxide. (G) is selected in accordance with extrusion workability or applicability, and properties required of rubbery elastic bodies obtained by curing. The inorganic filler (G1) is preferably the reinforcing filler, more preferably a silica such as fumed silica, pyrogenic silica, silica aerogel and precipitated silica, and particularly preferably fumed silica.

The BET specific surface area of the non-surface-treated inorganic filler (G1) is 50 to 500 $m^2/g$, more preferably 80 to 400 $m^2/g$, still more preferably 100 to 300 $m^2/g$, and particularly preferably 110 to 240 $m^2/g$.

(G2) is an inorganic filler obtained by surface-treating the non-surface-treated inorganic filler (G1) with hexamethyldisilazane. (G2) is also called hydrophobic inorganic filler. When the raw material of (G2) (that is, (G1)) is a silica, (G2) is also called hydrophobic silica. (G2) is preferably the inorganic filler obtained by surface-treating the non-surface-treated inorganic filler (G1) with hexamethyldisilazane by a dry process (for example, in the absence of (A)).

The upper limit of the amount of carbon in (G2) is not particularly limited. The amount of carbon in (G2) is preferably 1.0 to 15.0 wt %, more preferably 1.5 to 10.0 wt %, and particularly preferably 2.8 to 8.0 wt %. When the amount of carbon is in this range, (G2) has been sufficiently hydrophobized with hexamethyldisilazane and is hydrophobized more efficiently with hexamethyldisilazane (E) contained in the composition. The amount of carbon in the surface-treated inorganic filler (for example, (G2)) may be measured by heating the surface-treated inorganic filler at 1300° C. in an oxygen atmosphere to pyrolyze the hydrophobic groups chemically bonded to the surface-treated inorganic filler into $CO_2$, and quantitatively determining the $CO_2$ with a trace carbon analyzer.

The BET specific surface area of (G2) is preferably less than 500 $m^2/g$, more preferably not less than 30 $m^2/g$ and less than 500 $m^2/g$, still more preferably 80 to 400 $m^2/g$, and particularly preferably 130 to 350 $m^2/g$. The specific surface area of the raw material (G1) may not necessarily be in the aforementioned preferred range as long as the BET specific surface area of (G2) satisfies the above preferred range.

(G) is preferably (G2) to attain further enhancements in the curing rate and adhesion at room temperature.

⟨(H) Additional Components⟩

The composition may include an additional component (H) while still achieving the advantageous effects of the present invention. Examples of such components include a zirconium compound (H1), a reaction inhibitor (H2), an inorganic filler (H3) other than (G), an additional adhesion imparting agent (H4) (except the adhesion imparting agents (D)), a polyorganohydrogensiloxane (H5) having 2 hydrogen atoms bonded to a silicon atom in the molecule, an organosilazane (H6) (except hexamethyldisilazane (E)), and various additives (H7), with the zirconium compound (H1) and the reaction inhibitors (F2) being preferable. These types of the additional component (H) may be each used singly or may be each a combination of two or more components.

⟨⟨(H1) Zirconium Compounds⟩⟩

The zirconium compound (H1) is not particularly limited as long as the compound contains zirconium. Examples of (H1) include zirconium acylates such as zirconium octanoate, zirconium tetra(2-ethylhexanoate) and zirconium stearate; zirconium alkoxides (except zirconium chelates) such as n-propyl zirconate and n-butyl zirconate; and zirconium chelates such as tributoxyzirconium acetylacetonate, dibutoxyzirconium bis(ethylacetoacetate), zirconium tetraacetylacetonate, zirconium monoacetylacetonate and zirconium ethylacetoacetate. The zirconium chelates may have an alkoxy group as long as having 1 or more chelate ligands (such as, for example, $C_5H_7O_2$ or $C_6H_9O_3$) in the molecule. For the reason that the adhesion to various substrates is further enhanced, (H1) is preferably a zirconium chelate compound.

⟨⟨(H2) Reaction Inhibitors⟩⟩

Examples of the reaction inhibitors (H2) include organic compounds having a polar group in the molecule such as diallyl maleate; and organic compounds having an unsaturated bond such as acetylene alcohols and derivatives thereof. The reaction inhibitors (H2) retard the rate of the curing reaction of the composition, and also contribute to enhancing the handling workability and the balance between the expression of adhesion and the curing rate.

⟨⟨(H3) Inorganic Fillers Other than (G)⟩⟩

Examples of the inorganic fillers (H3) other than (G) include reinforcing fillers such as those obtained by hydrophobizing the surface of, for example, fumed silica, pyrogenic silica, silica aerogel, precipitated silica and fumed titanium oxide with hydrophobizing agents other than hexamethyldisilazane (E) (such as an organosilazane (H6) described later (except hexamethyldisilazane (E)) and polyorganosiloxanes). (H3) is selected in accordance with extrusion workability and properties required of rubbery elastic bodies obtained by curing. The BET specific surface area of the inorganic filler (H3) other than (G) is preferably 50 to 500 m$^2$/g, and particularly preferably 100 to 400 m$^2$/g. Further, conductive fillers such as carbon blacks may be added in accordance with purposes. The inorganic filler (H3) other than (G) impart appropriate fluidity to the composition before curing and impart high mechanical strength to rubbery elastic bodies obtained by curing.

⟨⟨(H4) Additional Adhesion Imparting Agents⟩⟩

The composition may further include an additional adhesion imparting agent (H4) (except the adhesion imparting agents (D)) as long as the catalytic ability of (C) is not impaired. Examples of the additional adhesion imparting agents (H4) (except the adhesion imparting agents (D)) include metal alkoxides (except zirconium alkoxides) such as aluminum alkoxides including aluminum triethoxide, aluminum tripropoxide and aluminum tributoxide; and titanium alkoxides including titanium tetraethoxide, titanium tetrapropoxide, titanium tetraisopropoxide, titanium tetrabutoxide, titanium tetraisobutoxide and titanium tetraisopropenyl oxide. The addition of these metal alkoxides can further increase the bond strength.

⟨⟨(H5) Polyorganohydrogensiloxanes Having 2 Hydrogen Atoms Bonded to Silicon Atom in Molecule⟩⟩

The composition may further include a polyorganohydrogensiloxane (H5) having 2 hydrogen atoms bonded to a silicon atom in the molecule. (H5) can function as a chain extender by undergoing addition reaction with components such as (A). The description of (H5) is the same as that of (B) except that (H5) have 2 hydrogen atoms bonded to a silicon atom in the molecule. In their molecules, (H5) have 2 units represented by the general formula (III) described with respect to (B).

The siloxane skeleton of (H5) may be linear, branched or cyclic, and is preferably linear. (H5) is more preferably a linear polyorganohydrogensiloxane that is blocked with an $R^6_3SiO_{1/2}$ unit independently at both terminals and includes only an $R^6_2SiO_{2/2}$ unit as the intermediate unit, wherein $R^6$ independently at each occurrence denotes a hydrogen atom or a monovalent hydrocarbon group having no aliphatic unsaturated bonds, with the proviso that two of $R^6$ are hydrogen atoms. The hydrogen atoms bonded to a silicon atom may be present at the terminals or in the intermediate units, but are preferably present at the terminals. That is, (H5) is particularly preferably a polymethylhydrogensiloxane that is blocked with an $M^H$ unit (a dimethylhydrogensiloxane unit) at both terminals and includes only a D unit (a dimethylsiloxane unit) as the intermediate unit.

⟨⟨(H6) Organosilazane (Except Hexamethyldisilazane (E))⟩⟩

The composition may further include an organosilazane (H6) (except hexamethyldisilazane (E)). (H6) are not particularly limited as long as they are organosilazane compounds other than hexamethyldisilazane which have a silazane bond (Si—N) having organic groups. Examples include alkenyl group-containing alkylsilazanes such as 1,3-divinyl-1,1,3,3-tetramethyldisilazane, and alkylsilazanes which have a hydrogen atom directly bonded to a silicon atom, such as 1,1,3,3-tetramethyldisilazane.

⟨⟨(H7) Various Additives⟩⟩

Depending on purposes, the composition may further include various additives (H7) such as organic solvents, pigments (except (G)), thixotropic agents, viscosity modifiers for improving extrusion workability, ultraviolet protective agents, fungicides, heat resistance improvers and flame retardants. These types of the additives (H7) may be each used singly or may be each a combination of two or more additives. In some applications, the composition may be dissolved or dispersed in an organic solvent such as toluene or xylene.

Incidentally, it is preferable that the composition be free from acid anhydrides. The absence of acid anhydrides in the composition makes it possible to avoid corrosion problems in metal substrates.

[Contents of Components]

The contents of the components in the composition are as follows.

The content of (A) is preferably 10 to 5,000 parts by weight, more preferably 50 to 4,000 parts by weight, and particularly preferably 100 to 3,000 parts by weight with respect to 100 parts by weight of the total of (B), (C), (D), (E) and (F). This range of the content ensures that adhesion at room temperature will be efficiently enhanced.

When (A) is a mixture of the linear alkenyl group-containing polyorganosiloxane (A1) and the branched alkenyl group-containing polyorganosiloxane (A2), the content of the branched alkenyl group-containing polyorganosiloxane (A2) is preferably 1 to 80 parts by weight, and particularly preferably 1 to 60 parts by weight with respect to 100 parts by weight of the total of (A2) and the linear alkenyl group-containing polyorganosiloxane (A1). When the content of (A2) is 80 parts by weight or less, the crosslink density is not excessively high and cured products attain more excellent flexibility. Further, the above range of the content of (A2) ensures that adhesion at room temperature will be further improved.

The content of (B) is preferably such that the ratio (H/Vi) of the number H of hydrogen atoms bonded to a silicon atom in (B) to the number Vi of alkenyl groups in (A) is not less than 0.1 and less than 1.5, more preferably 0.2 to 1.2, and particularly preferably 0.3 to 1.0. When the H/Vi in the composition is 0.1 or above, cured products tend to be excellent in mechanical strength. When the ratio is less than 1.5, the composition tends to exhibit enhanced adhesion with respect to various members.

The content of (C) is preferably 0.1 to 1,000 ppm by weight, and particularly preferably 0.5 to 200 ppm by weight in terms of platinum metal atoms with respect to (A). When the content of (C) is in this range, the curing rate at room temperature tends to be sufficiently high.

When the composition includes (D1), (D2) and/or (D3), the total amount of (D1), (D2) and/or (D3) is preferably 0.1 to 20 parts by weight, and particularly preferably 0.5 to 10 parts by weight with respect to 100 parts by weight of (A). This range of the content tends to ensure that sufficient adhesion will be obtained at room temperature and cured products of the composition will attain enhanced mechanical strength and flexibility. When the composition includes (D4), the content of (D4) is preferably 0.01 to 10 parts by weight, and particularly preferably 0.1 to 5 parts by weight with respect to 100 parts by weight of (A) to ensure that excellent adhesion to metals at room temperature will be imparted to silicone rubbers obtained by curing.

To attain good adhesion, (D) is preferably such that the weight ratio of one of (D1) to (D4) to another is in the range of 0.02 to 50 times, and particularly preferably in the range of 0.05 to 20 times. When (D) is a mixture of 3 or 4 kinds selected from the group consisting of (D1) to (D4), it is preferable that the respective proportions be not less than 3 wt %, and particularly preferably not less than 5 wt % of (D).

The content of (E) is preferably 0.1 to 50 parts by weight, and particularly preferably 1 to 30 parts by weight with respect to 100 parts by weight of (G). This range of the content ensures that (G) will be surface-treated with (E) more effectively. When the content of (E) is 0.1 part by weight or more with respect to 100 parts by weight of (G), sufficient adhesion is exhibited. When the content is 50 parts by weight or less, the adhesion can be efficiently improved. The content of (E) may be determined in consideration of the specific surface area of (G) and whether (G) has been treated with hexamethyldisilazane beforehand (that is, whether (G) is (G2)).

The content of (F) is preferably 5.0 to 100 parts by weight, and particularly preferably 10.0 to 60.0 parts by weight with respect to 100 parts by weight of (E). When the content of (F) is 5.0 parts by weight or more with respect to 100 parts by weight of (E), the component (E) can be sufficiently hydrolyzed to offer an excellent treatment effect on the component (G). When the content is 100 parts by weight or less, the balance between the amount added and the effect of surface treatment is efficient.

The content of (G) is preferably 0.1 to 50 parts by weight, and particularly preferably 1 to 30 parts by weight with respect to 100 parts by weight of (A). This content ensures that the composition will exhibit excellent extrusion workability and cured products obtained therefrom will attain excellent mechanical strength.

The content of (H1) is preferably not less than 0.0025 parts by weight and less than 0.10 parts by weight, more preferably 0.005 to 0.070 parts by weight, and particularly preferably 0.010 to 0.050 parts by weight in terms of zirconium atoms in (H1) with respect to 100 parts by weight of (A). When the content of (H1) with respect to 100 parts by weight of (A) is in the above range, higher adhesion is obtained at room temperature with respect to various substrates, particularly PPS.

The contents of the additional components (H) other than (H1) are not particularly limited as long as the composition can be used for the intended purpose.

(Methods for Producing Compositions)

The composition may be produced by uniformly kneading the essential components (A) to (G) and optionally the additional components (H) with a mixing device such as a universal kneading machine or a kneader. To ensure that (G) will be surface-treated with (E) more efficiently, the method for producing the composition preferably includes a step in which (E) and (F) are admixed to (A) and thereafter (G) is admixed to the mixture. (B), (C) and (D) may be added in any order, but it is preferable that (B), (C) and (D) be added and mixed after the step of admixing (G).

(Preferred Embodiments of Compositions)

For stable long-term storage, the components may be appropriately stored in two containers so that (B) and (D) are contained in a different container from (C), and the components may be mixed together and defoamed under reduced pressure immediately before use. The composition in this case is a composition consisting solely of first and second parts including (A) to (G) in which the first part includes (C), the second part includes (B) and (D), and (A), (E), (F) and (G) are independently included in the first part and/or the second part. The composition in this case is preferably produced by a method that includes a step of obtaining the first part which includes a sub-step (1a) of admixing (E) and (F) to (A) and thereafter admixing (G) to the mixture, and a sub-step (1b) of admixing (C), an optional component (H1) and optionally (D2) to (D4) as required to the mixture; and a step of obtaining the second part which includes a sub-step (2a) of admixing (E) and (F) to (A) and thereafter admixing (G) to the mixture, and a sub-step (2b) of admixing (B), (D) and optional components (H1) and (H2) to the mixture.

(Adhering Methods)

The composition may be applied to an adherend by, for example, being poured, dropped, flowed, cast or extruded from a container to a adhering site, or by being monolithically transfer molded or injection molded with the adherend, and may be concurrently adhered to the adherend by being allowed to stand at room temperature (for example, 23° C.) and to cure. The composition can give silicone rubber having excellent adhesion and flexibility even when cured at a higher temperature. When curing is performed at an elevated temperature, the composition can be cured in a shorter time than at room temperature, and thus the working efficiency can be enhanced. The heating conditions may be controlled appropriately in accordance with the heatproof temperature of a member to which the composition is applied, and the curing time may be determined correspondingly. For example, heat above room temperature (23° C.) and not more than 120° C. may be applied for 1 minute to 2 weeks, preferably 5 minutes to 72 hours. From the point of view of operability, the heating temperature is preferably 40 to 120° C., and particularly preferably 50 to 110° C. From the point of view of the simplicity of the curing step, the amount of heating time is preferably 5 minutes to 72 hours, and particularly preferably 5 minutes to 24 hours. When curing is performed at room temperature, the amount of curing time is preferably not more than 1 week, more preferably not more than 72 hours, and particularly preferably not more than 24 hours.

The materials of the adherends are not particularly limited. Examples thereof include metals such as aluminum, magnesium, nickel, iron and copper, alloys thereof, and polymers such as ABS (acrylonitrile butadiene styrene resins), polycarbonate resins, PBT (polybutylene terephthalate resins) and PPS (polyphenylene sulfide resins).

(Uses)

For example, the composition may be used to mount or encapsulate electric or electronic parts and automobile parts, and to bond semiconductors or general-purpose plastics. Specifically, the composition may be used as a sealant or a potting agent for various parts such as optical elements and semiconductor modules.

EXAMPLES

Hereinbelow, the present invention will be described in greater detail based on Examples and Comparative Examples. In these examples, parts indicate parts by weight and the viscosity is a viscosity at 23° C. The scope of the present invention is not limited by these examples.

(Components Used)

The components used in Examples and Comparative Examples are as follows.

(A) Alkenyl Group-Containing Polyorganosiloxane
A: Mixture of A-1 and A-2. The weight ratio of A-1 to A-2 is A-1:A-2=7:3.
A-1: Linear polymethylvinylsiloxane represented by $M^{vi}D_nM^{vi}$ (wherein n is such a value that the viscosity at 23° C. is 10 Pa·s) and having a viscosity of 10 Pa·s.
A-2: Branched polymethylvinylsiloxane consisting of M unit, $M^{vi}$ unit and Q unit and having a molar unit ratio of $M_5M^{vi}Q_8$ (weight average molecular weight: 4,000, average number of vinyl groups per molecule: 4)
(B) Polyorganohydrogensiloxane
B: Linear polymethylhydrogensiloxane represented by $MD^H{}_{20}D_{20}M$
(C) Platinum-Based Catalyst
C: Mixture of platinum vinyl siloxane complex (PT-$M^{vi}M^{vi}$ complex) obtained by heating chloroplatinic acid with siloxane dimer represented by $M^{vi}M^{vi}$, and A-1 (($M^{vi}D_nM^{vi}$ (10 Pa·s))) (5.0 wt % Pt)
(D) Adhesion Imparting Agents
D-1: Cyclic siloxane represented by the formula:

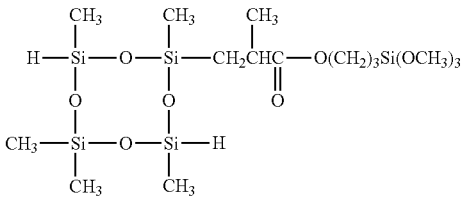

D-2: 3-Glycidoxypropyltrimethoxysilane
D-3: Vinyltrimethoxysilane
D-4: Partially hydrolyzed condensate (tetramer) of tetramethoxysilane
(E) Hexamethyldisilazane
E: Hexamethyldisilazane
(F) Water
F: Ion-exchanged water
(G) Inorganic Fillers
(G1) Non-Surface-Treated Inorganic Fillers with BET Specific Surface Area of 50 to 500 $m^2/g$
   G1-1: Fumed silica with specific surface area of 300 $m^2/g$ (non-surface-treated, Aerosil 300 manufactured by NIPPON AEROSIL CO., LTD.)
   G1-2: Fumed silica with specific surface area of 200 $m^2/g$ (non-surface-treated, Aerosil 200 manufactured by NIPPON AEROSIL CO., LTD.)
   G1-3: Fumed silica with specific surface area of 130 $m^2/g$ (non-surface-treated, REOLOSIL QS-10 manufactured by Tokuyama Corporation)
(G2) Inorganic Fillers Obtained by Surface-Treating (G1) with Hexamethyldisilazane
   G2-1: Silica (REOLOSIL HM-305, specific surface area: 200 $m^2/g$, amount of carbon: 3.5 wt %, manufactured by Tokuyama Corporation) obtained by surface-treating fumed silica (non-surface-treated) having specific surface area of 300 $m^2/g$ with hexamethyldisilazane
   G2-2: Silica (Silica 1, specific surface area: 150 $m^2/g$, amount of carbon: 3.8 wt %) obtained by surface-treating fumed silica (non-surface-treated) having specific surface area of 200 $m^2/g$ with hexamethyldisilazane
   G2-3: Silica (Silica 2, specific surface area: 100 $m^2/g$, amount of carbon: 2.0 wt %) obtained by surface-treating fumed silica (non-surface-treated) having specific surface area of 130 $m^2/g$ with hexamethyldisilazane
(G3) Additional Inorganic Fillers (Additional Inorganic Fillers (G3) Correspond to "Inorganic Fillers (H3) Other than (G)")
   G3-1: Silica (Silica 3, specific surface area: 160 $m^2/g$, amount of carbon: 2.1 wt %) obtained by treating fumed silica (non-surface-treated) having specific surface area of 200 $m^2/g$ with octamethylcyclotetrasiloxane ($D_4$)
   G3-2: Silica (Aerosil R-972, specific surface area: 120 $m^2/g$, amount of carbon: 1.0 wt %, manufactured by NIPPON AEROSIL CO., LTD.) obtained by treating fumed silica (non-surface-treated) having specific surface area of 130 $m^2/g$ with dimethyldichlorosilane (($CH_3)_2SiCl_2$)
   G3-3: Silica (REOLOSIL X-30, specific surface area: 120 $m^2/g$, amount of carbon: 7.5 wt %, manufactured by Tokuyama Corporation) obtained by treating fumed silica (non-surface-treated) having specific surface area of 300 $m^2/g$ with polydimethylsiloxane
(H) Additional Components
H-1: Zirconium compound: $(n\text{-}C_4H_9O)_3Zr(C_5H_7O_2)$ tributoxyzirconium acetylacetonate (ZC-540, manufactured by Matsumoto Fine Chemical Co. Ltd.), effective amount: 45 wt %, metal content: 10.2 wt %
H-2: Reaction inhibitor: Diallyl maleate Example 1

(1) Preparation of First Part
900 Parts by weight of A, 40 parts by weight of E and 15 parts by weight of F were transferred to a universal kneading machine and were stirred at room temperature (23° C.) for 10 minutes. 200 Parts by weight of G was added thereto, and the mixture was stirred at room temperature for 60 minutes and was stirred at 150° C. for 60 minutes under reduced pressure. After the mixture was cooled to not more than 50° C., 923 parts by weight of A was added and the resultant mixture was stirred for 30 minutes. C was added in such an amount that the amount of platinum would be 100 ppm with respect to the total weight of the first part, and the mixture was stirred at room temperature for 10 minutes. 6.6 Parts by weight of H-1 was added, and the mixture was stirred at room temperature for 10 minutes. The first part was thus prepared.
(2) Preparation of Second Part
900 Parts by weight of A, 40 parts by weight of E and 15 parts by weight of F were transferred to a universal kneading machine and were stirred at room temperature (23° C.) for 10 minutes. 200 Parts by weight of G was added thereto, and the mixture was stirred at room temperature for 60 minutes and was stirred at 150° C. for 60 minutes under reduced pressure. After the mixture was cooled to not more than 50° C., 536 parts by weight of A was added and the resultant mixture was stirred for 30 minutes. 57 Parts by weight of B was added and the mixture was stirred at room temperature for 10 minutes. There were added 0.75 parts by weight of H-2, 240 parts by weight of D-1, 40 parts by weight of D-2, 35 parts by weight of D-3 and 25 parts by weight of D-4, and the mixture was stirred at room temperature for 10 minutes. The "second part" was thus prepared.
(3) Preparation of Polyorganosiloxane Composition (Mixture of First Part and Second Part)
The "first part" and the "second part" prepared beforehand were mixed together and the mixture was rapidly kneaded under reduced pressure for 10 minutes and was thereby defoamed. A polyorganosiloxane composition (a mixture of the first part and the second part) was thus prepared. The H/Vi in the composition was 0.50.

Examples 2 to 6 and Comparative Examples 1 to 10

Polyorganosiloxane compositions were prepared in accordance with the process of Example 1. In Tables 2 to 4, "No" in "Surface treatment during process" means that the "first part" and the "second part" were prepared in the same manner as in Example 1 except that E and F were not added. The proportions of the components added in Examples including Example 1 and Comparative Examples are described in Table 1.

(Evaluation Methods)

⟨Amount of Carbon⟩

The inorganic filler that had been surface-treated was heated at 1300° C. in an oxygen atmosphere to pyrolyze the hydrophobic groups chemically bonded to the surface of the silica into $CO_2$. The amount of $CO_2$ was measured with a trace carbon analyzer ("EMIA-110" manufactured by HORIBA, Ltd.) to determine the carbon content in the surface-treated inorganic filler.

⟨Adhesion Test⟩

The adhesion was tested by the following evaluation method.

The compositions of the experiments were each added to a coker to fill the same. The composition was extruded from the coker onto test pieces (80 mm×25 mm×2 mm) of materials shown in Tables 2 to 4 so as to form a bead 10 mm in diameter and 60 mm in length. The composition was allowed to stand at 50° C. for 30 minutes or allowed to stand at 23° C. and 50% RH for 1 day or 3 days and was thereby cured and bonded. Cured products were thus obtained. Thereafter, an end portion of the interface between the cured product and the test piece was cut with a knife at room temperature (23° C.) to form a 20 mm incision, which was then pulled upward in a direction of 90° until the cured product ruptured. The adhesion was evaluated based on the rupture condition.

⊚: Excellent adhesion (the cured product ruptured while leaving a residual portion of the cured product attached to 100% of the bonding surface of the test piece).

○: Fair adhesion (the cured product ruptured while leaving a thin layer of the cured product attached to 100% of the bonding surface of the test piece).

Δ: Good adhesion (the cured product partly remained attached to the bonding surface of the test piece and was partly peeled therefrom).

X: No adhesion (the cured product was peeled from the test piece without any residue of the cured product attached to the bonding surface).

The results are described in Tables 1 to 4.

TABLE 1

|   |   | First part | Second part |
|---|---|---|---|
| A | Mixture of $M^{vi}D_nM^{vi}$ (10 Pa · s): $M_5M^{vi}Q_8$ = 7:3 | 91.15 | 71.8 |
| B | $MD^H_{20}D_{20}M$ |  | 2.85 |
| C | Mixture of Pt - $M^{vi}M^{vi}$ and $M^{vi}D_nM^{vi}$ (10 Pa · s) (5.0 wt % Pt) | 0.20 |  |
| D-1 | Cyclic siloxane |  | 12 |
| D-2 | 3-Glycidoxypropyltrimethoxysilane |  | 2.0 |
| D-3 | Vinyltrimethoxysilane |  | 1.75 |
| D-4 | Partial hydrolyzate (tetramer) of tetramethoxysilane |  | 1.25 |
| E | Hexamethyldisilazane | 2.0 | 2.0 |
| F | Ion-exchanged water | 0.75 | 0.75 |
| G | Inorganic filler | 10.0 | 10.0 |
| H-1 | $(n-C_4H_9O)_3Zr(C_5H_7O_2)$ | 0.33 |  |
| H-2 | Diallyl maleate |  | 0.038 |
| Total |  | 104.43 | 104.438 |

TABLE 2

| | Examples | 1 | | | 2 | | | 3 | | |
|---|---|---|---|---|---|---|---|---|---|---|
| G | | G 2 - 1 REOLOSIL HM-30S | | | G 2 - 2 Silica 1 | | | G 2 - 3 Silica 2 | | |
| | Specific surface area ($m^2/g$) of raw material | 300 | | | 200 | | | 130 | | |
| | Surface treatment agent | Hexamethyl-disilazane | | | Hexamethyl-disilazane | | | Hexamethyl-disilazane | | |
| | Specific surface area ($m^2/g$) after treatment | 200 | | | 150 | | | 100 | | |
| | Amount of carbon (wt %) | 3.5 | | | 3.8 | | | 2.0 | | |
| E and F | Surface treatment during process | Yes | | | Yes | | | Yes | | |
| Adhesion | Curing | 50° C. | 23° C. 50% RH | | 50° C. | 23° C. 50% RH | | 50° C. | 23° C. 50% RH | |
| test | conditions | 30 Min | +1 Day | +3 Days | 30 Min | +1 Day | +3 Days | 30 Min | +1 Day | +3 Days |
| | Die-cast aluminum | ⊚ | ⊚ | ⊚ | ⊚ | ⊚ | ⊚ | Δ | ⊚ | ⊚ |
| | PPS | ⊚ | ⊚ | ⊚ | ⊚ | ⊚ | ⊚ | ⊚ | ⊚ | ⊚ |
| | PBT | ⊚ | ⊚ | ⊚ | ⊚ | ⊚ | ⊚ | ⊚ | ⊚ | ⊚ |

| | Examples | 4 | 5 | 6 |
|---|---|---|---|---|
| G | | G 1 - 1 Aerosil 300 | G 1 - 2 Aerosil 200 | G 1 - 3 REOLOSIL QS-10 |
| | Specific surface area ($m^2/g$) of raw material | 300 | 200 | 130 |
| | Surface treatment agent | — | — | — |

TABLE 2-continued

|  |  |  |  |  |  |  |  |  |  |  |
|---|---|---|---|---|---|---|---|---|---|---|
| E and F | Specific surface area (m²/g) after treatment Amount of carbon (wt %) Surface treatment during process | — — Yes | | | — — Yes | | | — — Yes | | |
| Adhesion test | Curing conditions | 50° C. 30 Min | 23° C. 50% RH +1 Day | +3 Days | 50° C. 30 Min | 23° C. 50% RH +1 Day | +3 Days | 50° C. 30 Min | 23° C. 50% RH +1 Day | +3 Days |
|  | Die-cast aluminum | ○ | ◎ | ◎ | ◎ | ◎ | ◎ | ◎ | ◎ | ◎ |
|  | PPS | ○ | ◎ | ◎ | ○ | ◎ | ◎ | ○ | ◎ | ◎ |
|  | PBT | ◎ | ◎ | ◎ | ◎ | ◎ | ◎ | ◎ | ◎ | ◎ |

TABLE 3

|  | Comparative Examples | 1 | | | 2 | | | 3 | | |
|---|---|---|---|---|---|---|---|---|---|---|
| G |  | G 1 - 2 Aerosil 200 | | | G 2 - 1 REOLOSIL HM-30S | | | G 2 - 2 Silica 1 | | |
|  | Specific surface area (m²/g) of raw material | 200 | | | 300 | | | 200 | | |
|  | Surface treatment agent | — | | | Hexamethyl-disilazane | | | Hexamethyl-disilazane | | |
|  | Specific surface area (m²/g) after treatment | — | | | 200 | | | 150 | | |
|  | Amount of carbon (wt %) | — | | | 3.5 | | | 3.8 | | |
| E and F | Surface treatment during process | No | | | No | | | No | | |
| Adhesion test | Curing conditions | 50° C. 30 Min | 23° C. 50% RH +1 Day | +3 Days | 50° C. 30 Min | 23° C. 50% RH +1 Day | +3 Days | 50° C. 30 Min | 23° C. 50% RH +1 Day | +3 Days |
|  | Die-cast aluminum | X | X | Δ | Δ | ◎ | ◎ | Δ | ◎ | ◎ |
|  | PPS | X | X | X | X | ◎ | ◎ | X | ◎ | ◎ |
|  | PBT | X | X | X | ◎ | ◎ | ◎ | ○ | ◎ | ◎ |

|  | Comparative Examples | 4 | | | 5 | | | 6 | | |
|---|---|---|---|---|---|---|---|---|---|---|
| G |  | G 2 - 3 Silica 2 | | | G 3 - 1 Silica 3 | | | G 3 - 1 Silica 3 | | |
|  | Specific surface area (m²/g) of raw material | 130 | | | 200 | | | 200 | | |
|  | Surface treatment agent | Hexamethyl-disilazane | | | $D_I$ | | | $D_I$ | | |
|  | Specific surface area (m²/g) after treatment | 100 | | | 160 | | | 160 | | |
|  | Amount of carbon (wt %) | 2.0 | | | 2.1 | | | 2.1 | | |
| E and F | Surface treatment during process | No | | | No | | | Yes | | |
| Adhesion test | Curing conditions | 50° C. 30 Min | 23° C. 50% RH +1 Day | +3 Days | 50° C. 30 Min | 23° C. 50% RH +1 Day | +3 Days | 50° C. 30 Min | 23° C. 50% RH +1 Day | +3 Days |
|  | Die-cast aluminum | X | ◎ | ◎ | X | ◎ | ◎ | X | ◎ | ◎ |
|  | PPS | X | X | ◎ | X | X | ○ | X | Δ | ◎ |
|  | PBT | ◎ | ◎ | ◎ | X | X | ◎ | ◎ | ◎ | ◎ |

TABLE 4

|  | Comparative Examples | 7 | 8 |
|---|---|---|---|
| G |  | G 3 - 2 Aerosil R-972 | G 3 - 2 Aerosil R-972 |
|  | Specific surface area (m²/g) of raw material | 130 | 130 |
|  | Surface treatment agent | $Me_2SiCl_2$ | $Me_2SiCl_2$ |

TABLE 4-continued

| | | | | | | | |
|---|---|---|---|---|---|---|---|
| | Specific surface area (m²/g) after treatment | 120 | | | 120 | | |
| | Amount of carbon (wt %) | 1.0 | | | 1.0 | | |
| E and F | Surface treatment during process | No | | | Yes | | |
| Adhesion test | Curing conditions | 50° C. 30 Min | 23° C. 50% RH +1 Day | +3 Days | 50° C. 30 Min | 23° C. 50% RH +1 Day | +3 Days |
| | Die-cast aluminum | X | ⊚ | ⊚ | X | ⊚ | ⊚ |
| | PPS | X | X | X | X | X | ⊚ |
| | PBT | X | X | X | Δ | ⊚ | ⊚ |

| | Comparative Examples | 9 | 10 |
|---|---|---|---|
| G | | G 3 - 3 REOLOSIL X-30 | G 3 - 3 REOLOSIL X-30 |
| | Specific surface area (m²/g) of raw material | 300 | 300 |
| | Surface treatment agent | Polydi-methylsiloxane | Polydi-methylsiloxane |
| | Specific surface area (m²/g) after treatment | 120 | 120 |
| | Amount of carbon (wt %) | 7.5 | 7.5 |
| E and F | Surface treatment during process | No | Yes |

| | | | | | | | |
|---|---|---|---|---|---|---|---|
| Adhesion test | Curing conditions | 50° C. 30 Min | 23° C. 50% RH +1 Day | +3 Days | 50° C. 30 Min | 23° C. 50% RH +1 Day | +3 Days |
| | Die-cast aluminum | X | ⊚ | ⊚ | X | ⊚ | ⊚ |
| | PPS | X | X | X | ∧ | ⊚ | ⊚ |
| | PBT | ○ | ○ | ○ | ⊚ | ⊚ | ⊚ |

Abbreviations in Tables are as follows.
Die-cast aluminum: ADC-12 (JIS H 5302: 2006): Al—Si—Cu alloy
PPS: Polyphenylene sulfide resin (manufactured by TOSOH CORPORATION, Susteel GS-40%)
PBT: Polybutylene terephthalate resin (manufactured by Polyplastics Co., Ltd., DURANEX 2002)

As clear from Table 2, the polyorganosiloxane compositions of Examples were cured by being allowed to stand at 50° C. for 30 minutes and exhibited excellent adhesion to various substrates. "Allowed to stand at 50° C. for 30 minutes" corresponds to a case where the heating temperature for the composition is increased in order to shorten the operation time.

From the comparison of Examples 1 to 3 to Examples 4 to 6, the compositions including (G2) as (G) attained higher adhesion after allowed to stand at 50° C. for 30 minutes, and bonded excellently to various substrates (in particular, PPS). Further, the comparison of Examples 1 and 2 to Example 3 shows that particularly high adhesion is obtained when (G2) satisfies the particularly preferred range of the surface area and/or the amount of carbon. From the comparison of Examples 5 and 6 to Example 4, particularly high adhesion is obtained when the surface area of (G1) is in the particularly preferred range.

The composition of Comparative Example 1 was free from (E) and (F). Thus, there was no surface treatment occurring on (G) and the composition exhibited poor adhesion to various substrates.

The compositions of Comparative Examples 2 to 4 included (G2) as (G) but were free from (E) and (F). Thus, the compositions exhibited poor adhesion to various substrates (in particular, die-cast aluminum and PPS) on account of insufficient surface treatment on (G).

The compositions of Comparative Examples 5 to 10 did not contain (G). The comparison between Comparative Examples 5 and 6, between Comparative Examples 7 and 8, and between Comparative Examples 9 and 10 shows that the adhesion with respect to various substrates (in particular, PPS) was low even when the composition included (E) and (F) (that is, even when the inorganic filler is surface-treated with hexamethyldisilazane in the presence of (A) during the preparation of the composition).

The invention claimed is:
1. An adhesive polyorganosiloxane composition comprising:
(A) a polyorganosiloxane having 2 or more alkenyl groups in the molecule;
(B) a polyorganohydrogensiloxane having 3 or more hydrogen atoms bonded to a silicon atom in the molecule;
(C) a platinum-based catalyst;
(D) at least two kinds of adhesion imparting agents selected from the group consisting of the following (D1) to (D4):
(D1) an organosilicon compound having a hydrogen atom bonded to a silicon atom, and a side chain of the following formula (I) bonded to a silicon atom:

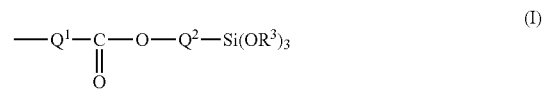

(D2) an organosilicon compound having a $Si(OR^3)_n$ group and an epoxy-containing group, and/or a partially hydrolyzed condensate thereof;
(D3) a silane compound having a $Si(OR^3)_n$ group and an aliphatic unsaturated hydrocarbon group, and/or a partially hydrolyzed condensate thereof; and (D4) a tetraalkoxysilane compound represented by Si(OR$^4$)$_4$, and/or a partially hydrolyzed condensate thereof;

wherein, Q$^1$ denotes a linear or branched alkylene group forming a carbon chain having 2 or more carbon atoms between the silicon atom and the ester bond; Q$^2$ denotes a linear or branched alkylene group forming a carbon chain having 3 or more carbon atoms between the oxygen atom and the silicon atom in the side chain; R$^3$ denotes an alkyl group having 1 to 4 carbon atoms or a 2-methoxyethyl group; R$^4$ denotes an alkyl group having 1 to 3 carbon atoms; and n is an integer of 1 to 3;

(E) hexamethyldisilazane;

(F) water; and (G) at least one kind of an inorganic filler selected from (G1) and (G2):
(G1) an inorganic filler without surface treatment having a BET specific surface area of 50 to 500 m$^2$/g; and
(G2) an inorganic filler obtained by surface-treating said (G1) with hexamethyldisilazane.

2. The adhesive polyorganosiloxane composition according to claim 1, wherein (A) is a combination comprising (A1) a linear polyorganosiloxane that is blocked with an R$_3$SiO$_{1/2}$ unit at both terminals and includes an R$^2{}_2$SiO$_{2/2}$ unit as an intermediate unit, and has a viscosity at 23° C. of 0.1 to 500 Pas; and (A2) a branched polyorganosiloxane that essentially includes a SiO$_{4/2}$ unit and an R$_3$SiO$_{1/2}$ unit and optionally includes one or more kinds of units selected from the group consisting of an R$_2$SiO$_{2/2}$ unit and/or an RSiO$_{3/2}$ unit, wherein R is R$^1$ or R$^2$, R$^1$ is an alkenyl group, R$^2$ is a monovalent hydrocarbon group having no aliphatic unsaturated bonds, and two or more groups R$^1$ are present in the molecule.

3. The adhesive polyorganosiloxane composition according to claim 1, wherein (C) is a platinum-vinylsiloxane complex.

4. The adhesive polyorganosiloxane composition according to claim 1, further comprising (H1) a zirconium compound.

5. The adhesive polyorganosiloxane composition according to claim 1, further comprising (H2) a reaction inhibitor.

6. The adhesive polyorganosiloxane composition according to claim 2, wherein (C) is a platinum-vinylsiloxane complex.

7. The adhesive polyorganosiloxane composition according to claim 2, further comprising (H1) a zirconium compound.

8. The adhesive polyorganosiloxane composition according to claim 3, further comprising (H1) a zirconium compound.

9. The adhesive polyorganosiloxane composition according to claim 4, further comprising (H1) a zirconium compound.

10. The adhesive polyorganosiloxane composition according to claim 2, further comprising (H2) a reaction inhibitor.

11. The adhesive polyorganosiloxane composition according to claim 3, further comprising (H2) a reaction inhibitor.

12. The adhesive polyorganosiloxane composition according to claim 4, further comprising (H2) a reaction inhibitor.

13. The adhesive polyorganosiloxane composition according to claim 5, further comprising (H2) a reaction inhibitor.

14. The adhesive polyorganosiloxane composition according to claim 6, further comprising (H2) a reaction inhibitor.

15. The adhesive polyorganosiloxane composition according to claim 7, further comprising (H2) a reaction inhibitor.

16. The adhesive polyorganosiloxane composition according to claim 8, further comprising (H2) a reaction inhibitor.

* * * * *